United States Patent

Kato

Patent Number: 5,963,246
Date of Patent: Oct. 5, 1999

[54] MULTI-POINT VIDEO CONFERENCE SYSTEM

[75] Inventor: Tatsuya Kato, Tokyo, Japan

[73] Assignee: NEC Corporation, Japan

[21] Appl. No.: 09/018,121

[22] Filed: Feb. 3, 1998

[30] Foreign Application Priority Data

Feb. 5, 1997 [JP] Japan .................................. 9-022614

[51] Int. Cl.$^6$ ................................................ H04N 7/14
[52] U.S. Cl. ............................... 348/15; 348/14; 348/16
[58] Field of Search ........................... 348/14, 15, 16; 379/93.21, 202; 370/260

[56] References Cited

U.S. PATENT DOCUMENTS

| 4,710,917 | 12/1987 | Tompkins et al. | 348/15 |
| 5,625,407 | 4/1997 | Biggs et al. | 348/16 |
| 5,844,979 | 12/1998 | Raniere et al. | 348/15 |

FOREIGN PATENT DOCUMENTS

| 63-211988 | 9/1988 | Japan . | |
| 2-228158 | 9/1990 | Japan . | |
| 402228158 | 9/1990 | Japan | H04M 9/00 |
| 3-120944 | 5/1991 | Japan . | |
| 3-183288 | 8/1991 | Japan . | |
| 4-223648 | 8/1992 | Japan . | |
| 405153260 | 6/1993 | Japan | H04M 3/56 |
| 408251566 | 9/1996 | Japan | H04N 7/15 |

*Primary Examiner*—Curtis A. Kuntz
*Assistant Examiner*—Melur Ramakrishnaiah
*Attorney, Agent, or Firm*—Ostrolenk, Faber, Gerb & Soffen, LLP

[57] ABSTRACT

In a multi-point video conference system, when a user of one multi-point video conference terminal assigns another multi-point video conference terminal as the other side of a privacy communication, other multi-point video conference terminals which are not an object of the privacy communication control an image and voice of the one multi point video conference terminal on the basis of output control signals from the other multi-point video conference terminals which are not the object of the privacy communication. Therefore, it becomes possible to perform a privacy communication with using a usual multi-point control unit to hereby provide a multi-point video conference system having a general utility at low cost.

4 Claims, 6 Drawing Sheets

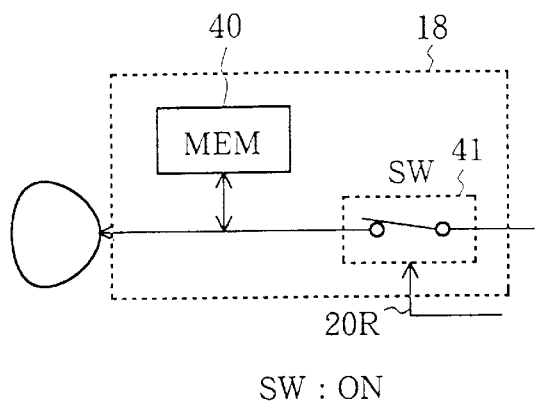
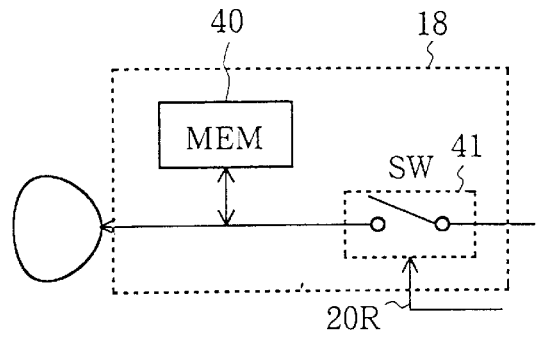
SW : ON
SW : OFF
FIG.7a
FIG.7b
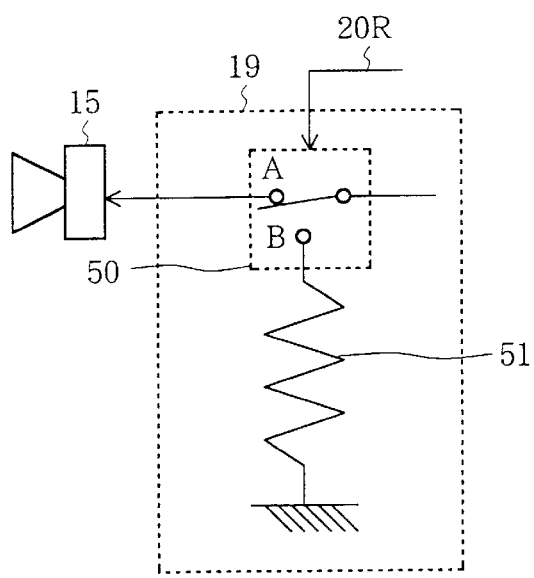
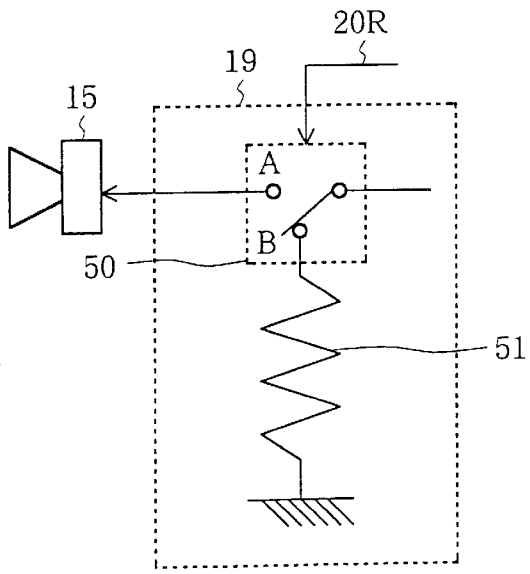
SW : ON
SW : OFF
FIG.8a
FIG.8a

MULTI-POINT VIDEO CONFERENCE SYSTEM

BACKGROUND OF THE INVENTION

The present invention claims priority from Japanese Patent Application No.9-22614 filed Feb. 2, 1997, the content of this being incorporated herein by reference.

1. Field of the Invention

The present invention relates to a multi-point video conference system and, particularly, to a privacy communication between specific points in a multi-point video conference.

2. Description of the Related Art

In a multi-point video conference system in which multi point video conference devices or terminals located in a plurality of points are connected to a multi-point control device through transmission paths and images of attendance of a conference at various points, that is, users of the multi-point video conference terminals, are displayed and their voices are output, in other multi-point video conference terminals, a privacy communication function for realizing a conversation between only specific points has been required.

In a conventional multi-point video conference system such as disclosed in, for example, Japanese Patent Application Laid-open No. H2-228158, a privacy communication function is realized by providing a controller in each video conference terminal for selecting at least two of multi-point video conference terminals which demand a privacy communication, a control signal processor in a video conference communication control unit, that is, multi-point control unit, for recognizing the video conference terminals demanding a mutual privacy communication and providing an information of the video conference terminals and an audio path controller in the multi-point control unit for controlling an audio path on the basis of the terminal information.

Such conventional multi-point video conference system will be described with reference to FIGS. 1, 2 and 3.

FIG. 1 is a block diagram showing a whole construction of such conventional multi-point video conference system.

The multi-point video conference system shown in FIG. 1 is constructed with a video conference communication controller 101, that is, a multi-point control unit and a plurality of multi-point video conference terminals 102, 103, 104 and 105 connected to the video conference communication controller 101 through bi-directional digital transmission paths 106, 107, 108 and 109, respectively.

The respective video conference terminals 102, 103, 104 and 105 are located in different points, send images and voices of attendance of a video conference through the bi-directional digital transmission paths and simultaneously receive the images and voices of other video conference terminals from the video conference communication controller 101 and display the images and output the voices thereof.

FIG. 2 is a block diagram showing a construction of the video conference terminal 102 of the multi-point video conference system shown in FIG. 1. Since the other video conference terminals 103, 104 and 105 have the same constructions as that of the video conference terminal 102, respectively, only the video conference terminal 102 will be described.

The video conference terminal 102 shown in FIG. 2 is constructed with an interface unit 110 connected to a bi-directional digital transmission path 106 for transmitting and receiving a signal, a signal processor 111 for multiplexing and processing an image of a user (input video signal), a voice (input audio signal) of the user and audio control signal, etc., a microphone 112 for input of a voice of an attendance of the conference, a loud-speaker 113 for output of voices of other conference attendance, a video camera 114 for input of the user image, a display 115 for output of the image of a talker in the video conference, a controller 116 for output of an audio control signal instructing a destination of the privacy communication and an echo canceler 117 for preventing an echo phenomenon from occurring due to an input of a voice from the loud-speaker 113 to the microphone 112.

In the video conference terminal 102 constructed as mentioned above, the audio signal, the video signal and the audio control signal from the microphone 112, the camera 114 and the controller 116 are multiplexed by the signal processor 111 and a resultant signal is sent from the interface unit 110 to the video conference communication controller 101 through the bi-directional digital transmission path 106.

On the other hand, the video conference communication controller 101 synthesizes an output video signal triggered by the audio signals transmitted from the respective video conference terminals 102, 103, 104 and 105 and synthesizes an output audio signal by summing the audio signals, as to be described later.

FIG. 3 shows a construction of the video conference communication controller 101 in the conventional multi-point video conference system disclosed in Japanese Patent Application Laid-open No. H2-228158.

The bi-directional digital transmission paths 106, 107, 108 and 109 and signal separators 118, 119, 120 and 121 connected to the respective bi-directional digital transmission paths receive the multiplexed signal from the respective video conference terminals 102, 103, 104 and 105, separate it to the input video signal, the input audio signal and the audio control signal and output them.

The input video signal among them is input to a video path unit 127 through an input video signal line 126 and the input audio signal is input to an audio level detector 133 and an audio path unit 124 through an input audio signal line 122. Further, the audio control signal is input to a control signal processor 130 through an audio control signal line 129.

An output of the audio path unit 124 and an output of the video path unit 127 are a input to the signal separators 118 to 121 through an output audio signal line 125 and an output video signal line 128, respectively. The respective signal separator units 118 to 121 multiplex these signals and send a resultant signal to the bi-directional digital transmission paths 106 to 109.

The control signal processor 130 functions to output an instruction assigning video conference terminals between which the audio privacy communication is to be performed, on the basis of the audio control signal output from the controller 116 of the video conference communication controller 101. An audio path control unit 131 controls the audio path unit 124 on the basis of the instruction output from the control signal processor 130 such that a content of the privacy communication is not output to other video conference terminals which are not objects of the privacy communication.

The audio level detector 123 detects one of the video conference terminals whose audio level is the highest. A video control unit 132 controls the video path unit 127 such that, among the video signals collected by the video path unit 127 through the input video signal line 125 from the respective terminals, a video signal of the video conference terminal 102 whose audio level is detected by the audio level detector 123 as the highest is output to the output video signal line 128. In this case, the output of the control signal processor 130 is also input to the audio level detector 123 to prevent the image in the privacy communication from being output.

A basic operation of the conventional multi-point video conference system constructed with the above mentioned multi-point video conference terminals and the video conference communication control unit (multi-point control unit) is as follow:

The video conference terminal 102 shown in FIG. 2 multiplexes the input video signal, the input audio signal and the audio control signal from the camera 114, the microphone 112 and the controller 116 and sends the resultant signal to the video conference communication controller 101 through the bi-directional digital transmission path 106.

The video conference communication controller 101 (FIG. 3) receives the multiplexed input signals from the respective video conference terminals 102 to 105 separates to the input video signals, the input audio signals and the audio control signals in the signal separators 118 to 121 and inputs them to the video path unit 127, the audio level detector 123, the audio path unit 124 and the control signal processor 130.

The audio level detector 123 outputs an information indicative of a terminal which outputs the highest level input voice to the video control unit 132. The video control unit 132 outputs, among the video signals collected by the video path unit 127 through the input video signal line 125 from the respective terminals, the video signal of the video conference terminal 102 whose audio level is detected by the audio level detector 123 as the highest to the output video signal line 128.

That is, there is a talker at the video conference terminal which outputs the highest level input voice. The information indicative of the video conference terminal having the talker is output to the video control unit 132. In response to the information, the video control unit 132 instructs the video path unit 127 to select the output video signals of other video conference terminals than that whose audio level is the highest or all of the video conference terminals as input video signals of the video conference terminal having the highest audio level.

In response to the instruction from the video control unit 132, the video path unit 127 selects, among the input video signals, output video signals corresponding to the respective video conference terminals 102 to 105 such that images of the video conference terminals having speakers become the output images of the other video conference terminals than the video conference terminals having talkers and the previously selected images or images of the video conference terminals having speakers become the output images of the video conference terminals having talkers and outputs them to the signal separators 118 to 121 through the output video signal line 128.

The audio signals received by the audio path unit 124 are synthesized to output audio signals corresponding to the respective video conference terminals 102 to 105 by audio signal summation such that voices from all of the other video conference terminals than one video conference terminal can be heard by the one video conference terminal usually, and the synthesized audio signals are output to the signal separators 118 to 121 through the output audio signal line 125.

Then, the respective signal separators 118 to 121 compress and multiplex the output video signals from the video path unit 127 and the output audio signals from the audio path unit 124 and send them to the corresponding video conference terminals 102 to 105 through the bi-directional digital transmission paths 106 to 109.

The interface units 110 of the respective video conference terminals 102 to 105 (FIG. 2) receive the multiplexed output signals sent from the video conference communication controller 101. The received signals are separated to the output video signals and the output audio signals by the signal processor 111. These output video signals and the output audio signals are expanded and then output to the respective displays 115 and the loud speakers 113.

When the privacy communication is to be performed in such conventional video conference system, the video conference communication controller 101 controls, on the basis of an instruction from the controller 116 of the video conference terminal 102 assigning the other video conference terminal of the audio privacy communication, the audio signal obtained in the audio path unit 124 such that voice of the video conference terminal 102 is not sent to other video conference terminals than the assigned specific video conference terminal.

That is, the signals sent out from the respective video conference terminals 102, 103, 104 and 105 as multiplexed signals are separated to the input video signals, the input audio signals and the audio control signals by the respective signal separators 118, 119, 120 and 121. The audio control signals among them are input to the control signal processor 130 through the audio control signal line 129. The control signal processor 130 recognizes the video conference terminal which demands the privacy communication and the other side video conference terminal and sends an information indicative of these video conference terminals to the audio path control unit 131 and the audio level detector 123.

The audio path control unit 131 sends an instruction with which voice of the video conference terminal which assigns the other video conference terminal for the audio privacy communication is sent to only the assigned video conference terminal, voice of the assigned video conference terminal is not sent to other video conference terminals than the assigning video conference terminal and the two video conference terminals between which the audio privacy communication is performed can hear voices from other video conference terminals than the two video conference terminals. In response to such instruction, the audio path unit 124 synthesizes or selects input audio signals supplied through the respective input audio signal lines 122 and sends them to the signal separators 118, 119, 120 and 121 through the respective output signal lines 125 as output audio signals.

Further, the audio level detector 123 receives the instruction related to the audio privacy communication output from the control signal processor 130 and controls the video path unit 127 by supplying the control signal containing the information of the audio privacy communication to the video control unit 132.

That is, the audio level detector 123 detects voice from the input audio signal line 122 having the highest audio level among the input audio signals input through the input audio signal lines 122 excluding the input audio signal of the video conference terminals which perform the audio privacy communication, on the basis of the instruction from the selected video conference terminal (terminal which performs the audio privacy communication) from the control signal processor 130, and transfers the information indicative of the signal separator from which the detected signal is input to the video control unit 132. As a result, the image input from the video conference terminals which are performing the privacy communication is prevented from being displayed on other video conference terminals which are not object of the privacy communication.

As described above, in the conventional multi-point video conference system, the control is performed in the multi-point control unit (video conference communication controller 101) for realizing the privacy communication. However, such conventional multi point video conference system has the following problems.

The first problem is that the general usability of the multi point control unit is lost in the combination of the video conference terminals and the multi-point control unit (video conference communication control unit). That is, in order to realize the privacy communication function in the conventional multi-point video conference system, the multi-point video conference terminals 102, 103, 104 and 105 have to have the controller 116 for providing specific audio control signal corresponding to the control signal processor 130 of the video conference communication controller 101. In other words, it is impossible for the multi-point video conference terminal which outputs such audio control signal to realize the audio privacy communication unless it is combined with the multi-point control unit including the audio communication control unit 131 which operates on the basis of the audio control signals sent from the respective video conference terminals to output an information identifying the video conference terminal which performs the audio privacy communication and the audio path unit 124 for synthesizing voices on the basis of the video conference terminal identifying information from the audio communication control unit 131.

The second problem is that the multi-point video conference system, particularly, the multi-point control unit thereof, is expensive. In general, the multi-point control unit for realizing the multi point video conference is not equipped with the privacy communication function. That is, the multi-point control unit is expensive even when it has no control signal processor and no audio path control unit, etc. As mentioned, in the case where the conventional video conference terminal has to have the privacy communication function, the control signal processor and the audio path control unit, etc., are to be newly added to the multi-point control unit of the multi-point video conference system in order to realize the audio privacy communication. Therefore, in such case, the video conference system becomes more expensive, causing use of such system to be difficult.

SUMMARY OF THE INVENTION

An object of the present invention is to provide a multi-point video conference system which has a general usability and can realize a privacy communication even using a usual multi-point control unit.

Another object of the present invention is to provide a multi point video conference system by which the privacy communication can be realized at low cost by simply modifying respective conventional multi point video conference terminals and to provide the multi-point video conference terminal resulting from the simple modification.

In order to achieve the above objects, according to a first aspect of the present invention, each of multi-point video conference terminals of a multi-point video conference system is provided with an output signal control portion.

When a user (an attendance at a video conference) of a certain of the multi-point video conference terminals assigns another one of the multi-point video conference terminals as an object of a privacy communication, the output signal control portions of each of other multi-point video conference terminals which are out of the privacy communication controls an output video signal and an output audio signal thereof such that an image and voice are muted.

In more detail, in the multi-point video conference system having a multi-point control unit and a plurality of multi-point video conference terminals arranged in a plurality of points and connected to the multi-point control unit through respective transmission paths to mutually transmit and receive images and voices of the respective multi-point video conference terminals, the multi-point control unit synthesizes, from input video signals, input audio signals and privacy communication identifying signals for identifying other video conference devices which are objects of a privacy communication transmitted from the plurality of the multi-point video conference devices, output video signals, output audio signals and output control signals, transmits the synthesized signals to the respective multi-point video conference devices. Each of the multi-point video conference terminals comprises an identifying signal generator for generating the privacy communication identifying signal, an input signal transmitter for transmitting the input signal obtained by multiplexing the input video signal, the input audio signal and the privacy communication identifying signal of a user to the transmission path, an output signal receiver for receiving an output signal obtained by multiplexing an output video signal, an output audio signal and an output control signal transmitted by the multi point control portion through the transmission path and separating the output video signal, the output audio signal and the output control signal and an output image control portion and an output voice control portion for controlling the output video signal input to image display means and the output audio signal input to audio reproducing means on the basis of the output control signal, respectively. The output image control portion includes an output image memory portion for temporarily storing the output video signal from the output signal receiver, determines, on the basis of the output control signal, whether or not the multi-point video conference terminal is an object of the privacy communication when any multi-point video conference terminals perform a privacy communication therebetween, inputs the output video signal from the output signal receiver to the image display means when the device is an object of the privacy communication or inputs an output video signal preliminarily stored in the output image memory portion to the image display means when the device is not the object of privacy communication. Further, the output voice control portion determines, on the basis of the output control signal, whether or not the multi point video conference terminal is an object of the privacy communication when any multi-point video conference terminals perform a privacy communication therebetween, inputs the output audio signal to the voice reproducing means when the video conference terminal is the object of privacy communication or cut the input signal of the voice reproducing means when the video conference terminal is not the object of privacy communication.

In the multi-point video conference system according to the present invention, the multi-point control unit separates the input video signals, the input audio signals and the privacy communication identifying signals from the multiplexed input signals transmitted from the respective multi-point video conference terminals, synthesizes the separated input video signals, the input audio signals and the privacy communication identifying signals as the output video signals, the output audio signals and the output control signals, respectively, multiplexes the output video signals, the output audio signals and the output control signals, respectively, and transmits the multiplexed output video signals, the multiplexed output audio signals and the multiplexed output control signals to the respective multi-point video conference terminals through the respective transmission paths, regardless of the synthesizing manner.

Therefore, any format of the output video signals and the output images synthesized from the input video signals obtained by the respective multi-point video conference terminals can be employed. For example, it may be possible to construct one frame by using all of the input video signals obtained from the respective multi-point video conference terminals, or to select one or a plurality of the input video signals. In such case, it is not always necessary to refer the input audio signal level and the privacy communication identifying signal as in the conventional video conference communication terminal. Therefore, although the input video signal from multi-point video conference terminal having a talker is selected from the input video signals transmitted from the multi-point video conference terminals by referring to the level of the input audio signal device and output as the output video signal as in the previously mentioned conventional video conference communication controller, it may be possible to synthesize the images obtained in the respective multi-point video conference terminals such that the images are displayed simultaneously in a single frame and use the synthesized signal as the output video signal.

Further, although it is possible to discretely synthesize the output video signals correspondingly to the respective multi-point video conference terminals, it may be possible to synthesize output video signals which are common to the respective multipoint video conference terminals.

Further, as to the audio signal, it may be possible to merely sum the input audio signals although it is possible to select a specific one of the input audio signals obtained by the respective multi-point video conference terminals as the output audio signal. Therefore, it is enough to sum the input audio signals sent from the respective multi-point video conference terminals and output a resultant signal as the output audio signal without necessity of voice path control on the basis of the privacy communication identifying signal as in the conventional multi-point video conference system.

Further, it may be possible to synthesize the output audio signals correspondingly to the respective multi-point video conference terminals or, alternatively, to synthesize only the output audio signals which are common for the respective multi-point video conference terminals.

The output control signal includes an information necessary to recognize the multi-point video conference terminals between which a privacy communication is performed within the multi-point video conference system.

The multi-point control unit is requested to synthesize the output control signal such that all of the privacy communication identifying signals transmitted from one of the multi-point video conference terminals are transmitted to the other multi-point video conference terminals. Therefore, the multi-point control unit may synthesize the output control signal by combining the privacy communication identifying signals input from the respective multi point video conference terminals.

On the other hand, the identifying signal generator of each video conference terminal outputs a privacy communication identifying signal for identifying another video conference terminal which is assigned by a user of the video conference terminal as an object of a privacy communication. The privacy communication identifying signal is enough to specify the multi-point video conference terminal which generates the privacy communication identifying signal and the other multi-point video conference terminal which performs the privacy communication with the video conference terminal generating the signal, regardless of the signal format thereof. For example, the privacy communication identifying signal output from the identifying signal generator may include a series of digital signal containing an identifier of the other multi-point video conference terminal assigned by the user, an identifier of the multi point video conference terminal belonging to the user and a code indicating that the communication is a privacy communication.

Such privacy communication identifying signal is multiplexed with the input video signal corresponding to an image of the user and the input audio signal corresponding to a voice of the user in the input signal transmitting portion and then sent to the transmission paths.

In order to improve the transmission efficiency, the input video signal and the input audio signal may be a video signal from a video camera and an audio signal from a microphone, which are compressed, respectively, and the input video and audio signals are multiplexed with the privacy communication identifying signal and transmitted as the input signal by the input signal transmitting portion. In such case, the input signal transmitting portion includes signal compression means in addition to the multiplexing means.

On the other hand, the output signal receiving portion receives the output signal transmitted from the multi-point control unit through the transmission path and separates the output signal to the output video signal, the output audio signal and the output control signal. In this case, the output signal receiving portion expands the compressed output video and audio signals output signal and outputs them together with the output control signal.

The output image control portion and the output voice control portion determine, on the basis of the information contained in the output control signal, whether or not any privacy communication is performed in the multi-point video conference system and whether or not the multi-point video conference terminal related to these portions is an object of the privacy communication. When any privacy communication is not performed in the multi-point video conference system or when the multi-point video conference terminal is the object of the privacy communication, the output image control portion inputs the output video signal obtained from the output signal receiving portion in the image display means and the output image memory portion. On the other hand, when a privacy communication is performed between other multi-point video conference terminals and when the multi-point video conference terminal is not an object of the privacy communication, the output image control portion thereof outputs a video signal stored in the output image memory portion to the image display means in lieu of the output video signal output from the output signal receiving portion. When any privacy communication is not performed in the multi-point video conference system or when the multi-point video conference terminal is an object of a privacy communication, the output voice control portion thereof inputs the output audio signal obtained from the output signal receiving portion to the voice reproducing means. On the other hand, when a privacy communication is performed between other multi-point video conference terminals and the multi-point video conference terminal is not an object of the privacy communication, the output voice control portion cuts the output audio signal input to the voice reproducing means. As a result, when a privacy communication is performed between any other multi-point video conference terminals, the image and voice related to the privacy communication are displayed and reproduced in only the multi-point video conference terminals which are objects of the privacy communication and a still image preliminarily stored in the output image memory portion is displayed in other multi-point video conference terminals which are not objects of the privacy communication and voices are not reproduced in these terminals.

In the multi-point video conference system according to the present invention constructed as mentioned above, the information identifying the multi-point video conference terminals between which privacy communication is performed is transferred to the respective multi point video conference terminals through a general channel and the controls of the output video signals and the output audio signals are performed in the respective multi-point video conference terminals. Therefore, it is possible to realize the privacy communication function without addition of any specific component to the multi-point control unit which is necessary for the multi-point conference and has the minimum necessary function. As a result, it is possible to improve the general usability of the multi-point video conference terminal in relation to the multi-point control unit and to provide the multi point video conference system at low cost.

In the present invention, the image to be displayed in the multi point video conference terminals which are not objects of a privacy communication during the privacy communication may be any so long as it is other than an image for the privacy communication. For example, when a certain multi-point video conference terminal is an object of a privacy communication, the output video signal output from the output signal receiving portion is input to the image display means and the output image memory portion and, when it is not an object of a privacy communication, the output video signal preliminarily stored in the output image memory portion is input to the image display means. With this construction, an image immediately before a start of a privacy communication between some multi-point video conference terminals is displayed on the image display means of each of the multi-point video conference terminals which are not objects of the privacy communication, during the privacy communication.

According to a second aspect of the present invention, the multi point video conference terminal for use in the above mentioned multi point video conference system comprises an identifying signal generator for generating a privacy communication identifying signal for identifying another video conference terminal which becomes an object of a privacy communication, an input signal transmitting portion for transmitting an input signal obtained by multiplexing an input video signal, an input audio signal and the privacy communication identifying signal to transmission paths, an output signal receiving portion for receiving an output signal obtained by multiplexing an output video signal, an output audio signal and an output control signal and transmitted from the multi-point control unit through transmission path and separating the output signal to the output video signal, the output audio signal and the output control signal and an output image control portion and an output voice control portion for controlling the output video signal input to an image display means and the output audio signal input to a voice reproducing means on the basis of the output control signal, respectively. The output image control portion includes an output image memory portion for temporarily storing the output video signal output from the output signal receiving portion and, when a privacy communication is performed between some multi-point video conference terminals, determine, on the basis of the output control signal, whether or not it is an object of the privacy communication. When it is the object of the privacy communication, the output video signal output from the output signal receiving portion is input to the image display means and, when it is not the object of the privacy communication, inputs the output video signal preliminarily stored in the output image memory portion in the image display means. When some of the multi-point video conference terminals perform a privacy communication, the output voice control portion determines, on the basis of the output control signal, whether or not it is an object of the privacy communication and, when it is the object of the privacy communication, inputs the output audio signal in the voice reproducing means and, when it is not the object of the privacy communication, cuts the signal to be input to the voice reproducing means.

With such construction, it is possible to realize a multi-point video conference terminal having a control function for a privacy communication by slightly modifying the conventional multi-point video conference terminal.

The multi-point video conference terminal may further comprise image pickup means such as video camera, sound collecting means such as microphone, image display means such as display and voice reproducing means such as loud-speaker and head-phone. In such case, the input video signal obtained by the image pickup means and the input audio signal obtained by the sound collecting means are sent from the input signal receiving portion to the transmission path. The image display means and the voice reproducing means are input with a video signal and a voice signal which are controlled in the output image control portion and the output voice control portion, respectively, to realize a privacy communication in a multi-point video conference. The output image control portion inputs the output video signal output from the output signal receiving portion to the image display means and the output image memory portion when it is an object of a privacy communication and inputs the output video signal already stored in the output image memory portion to the image display means when it is an object of the privacy communication. In this manner, during a privacy communication performed between some multi-point video conference terminals, an image immediately before the privacy communication is displayed on the image display means of other multi-point video conference terminals which are not objects of the privacy communication and the output audio signal is cut out in these terminals.

BRIEF DESCRIPTION OF THE DRAWINGS

The present invention will be described in more detail with reference to the accompanying drawings in which:

FIGS. 7a and 7b are circuit diagrams showing an operation of an image muting unit of the multi-point video conference terminal; and FIGS. 8a and 8b are circuit diagrams showing an operation of a voice muting unit of the multi-point video conference terminal.

DETAILED DESCRIPTION OF THE PREFERRED EMBODIMENTS

Figure 1:
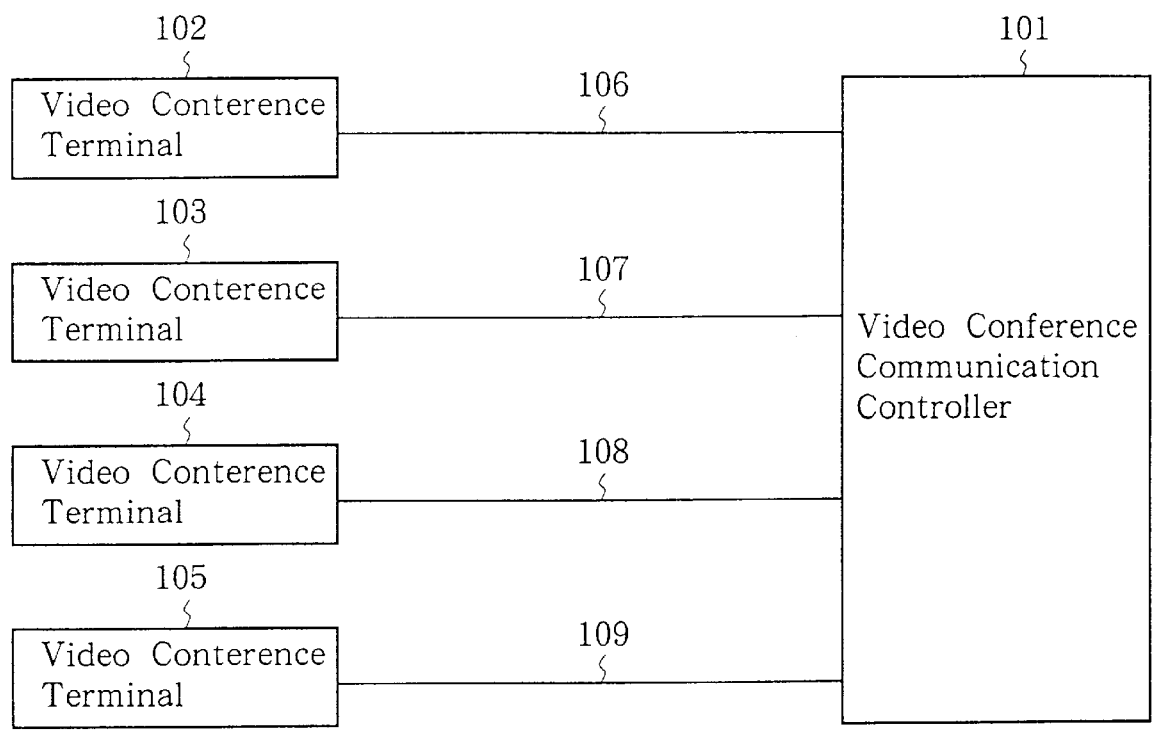
FIG. 1 is a block diagram showing a construction of a conventional multi-point video conference system.
Figure 2:
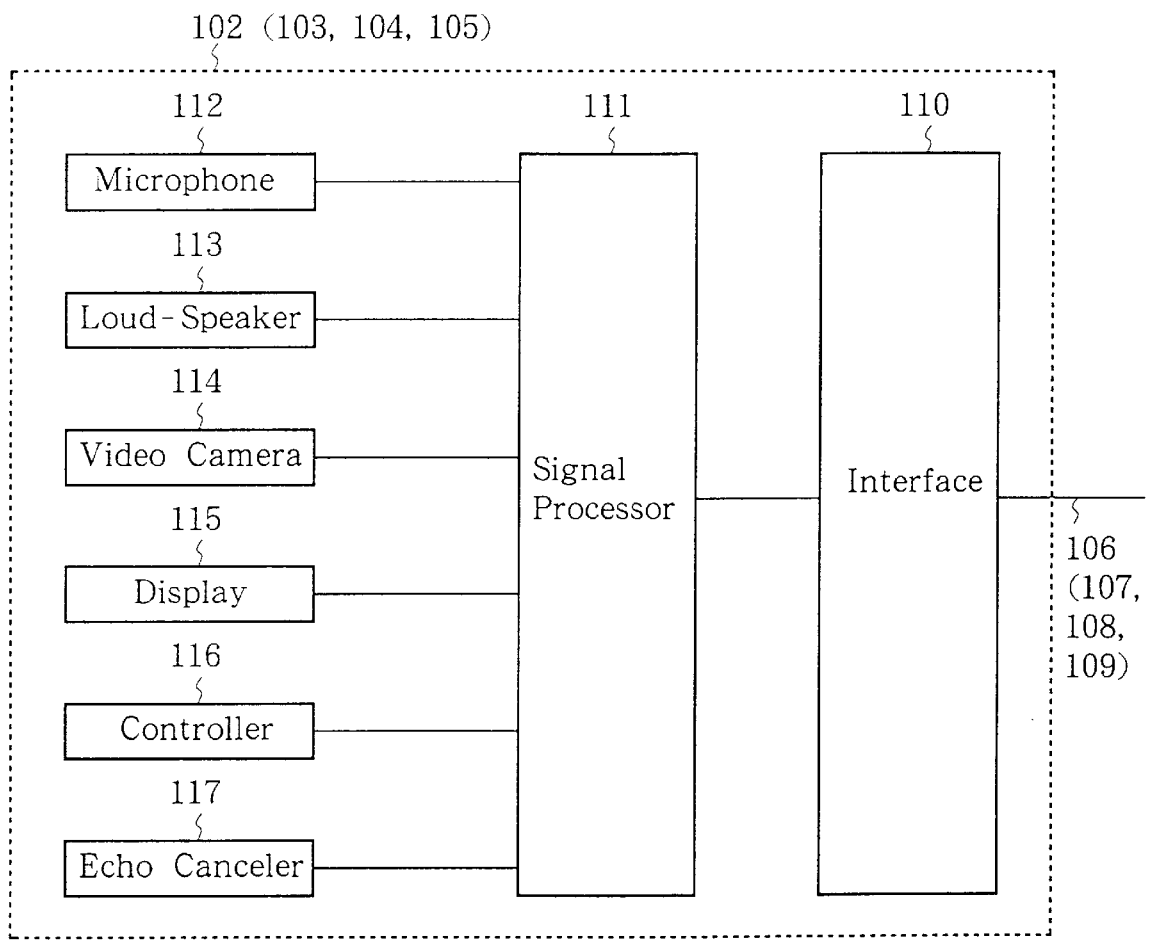
FIG. 2 is a block diagram showing a conventional multi-point video conference terminal.
Figure 3:
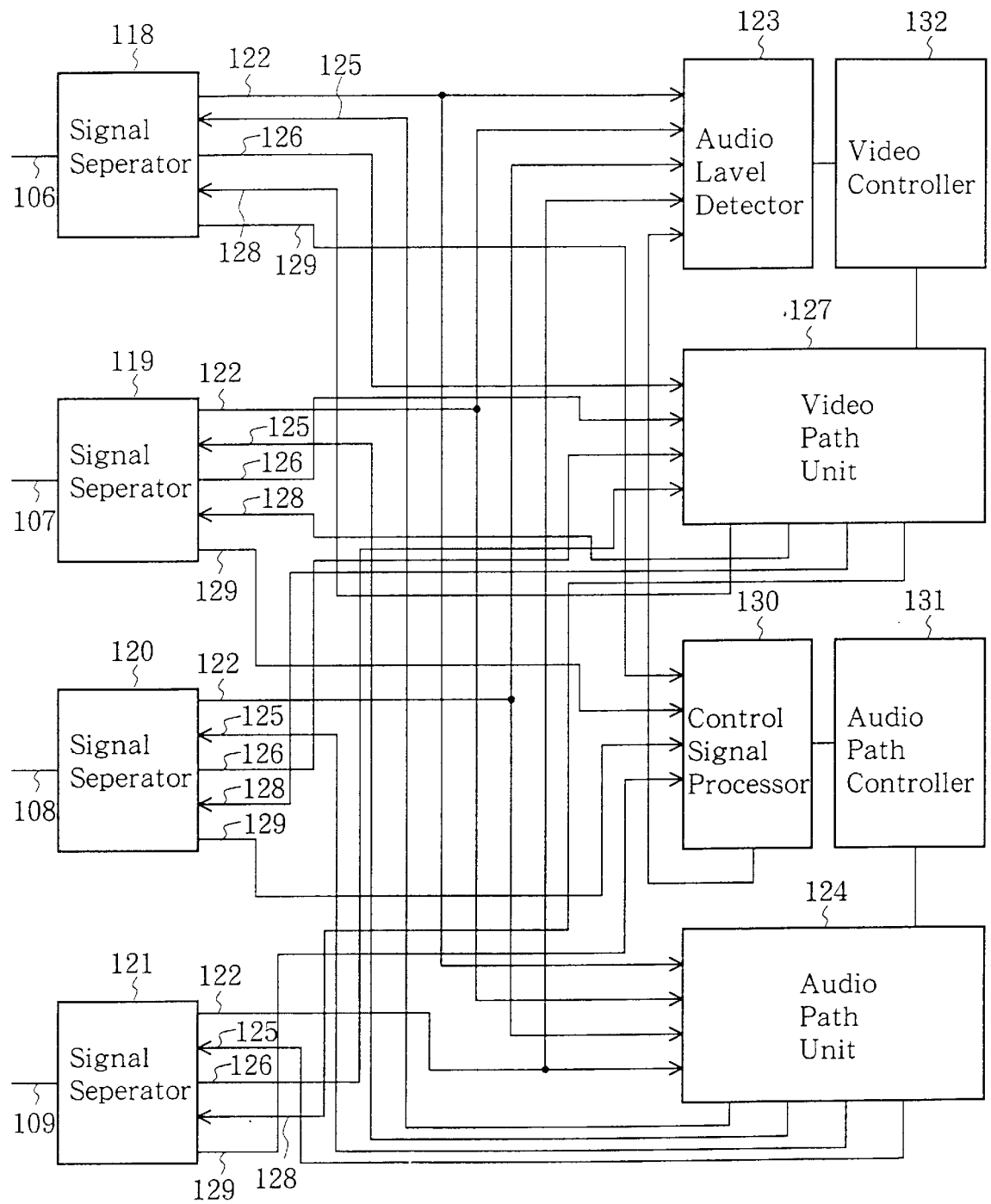
FIG. 3 is a block diagram showing a construction of a video conference communication controller in the conventional multi-point video conference system.
Figure 4:
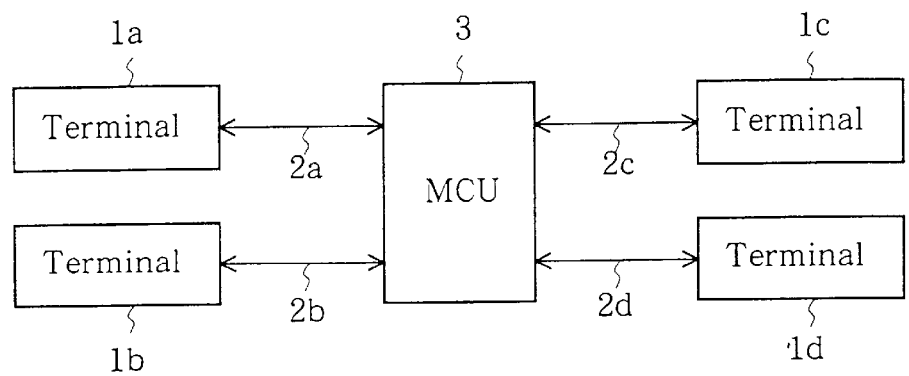
FIG. 4 is a block diagram showing a construction of a multi point video conference system according to an embodiment of the present invention.

A construction of a multi-point video conference system according to an embodiment of the present invention is shown in FIG. 4 schematically.

Multi-point video conference terminals (referred to as "video conference terminals", hereinafter) 1a, 1b, 1c and 1d are connected to a multi-point control unit (MCU) 3 through bi-directional digital transmission paths 2a, 2b, 2c and 2d, respectively. A multi-point video conference is performed by receiving multiplexed input signals transferred from the respective video conference devices 1a, 1b, 1c and 1d by the multi-point control unit 3 and receiving multiplexed output signal synthesized in the multi-point control unit 3 by the respective video conference terminals 1a, 1b, 1c and 1d.

Figure 5:
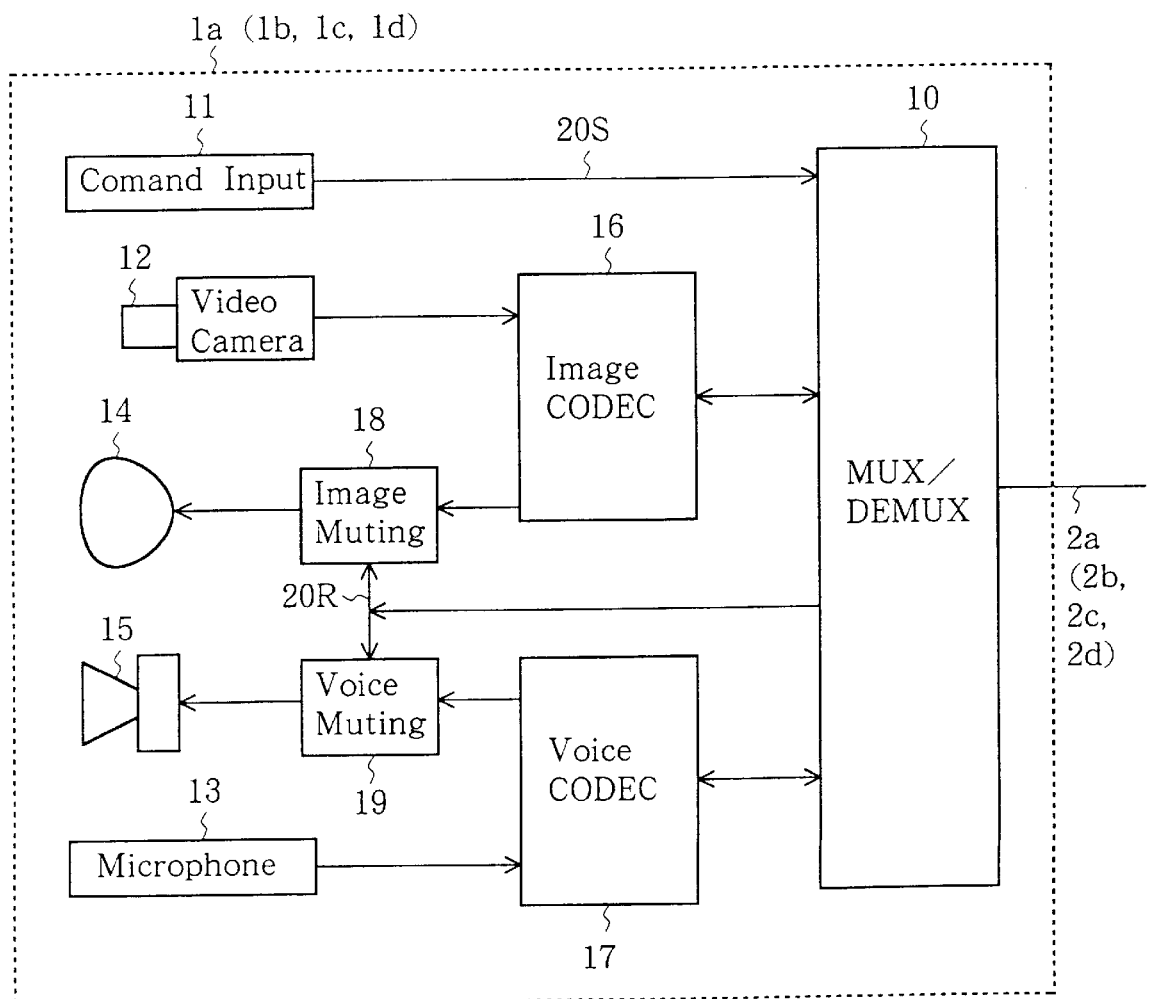
FIG. 5 is a block diagram showing a construction of a video conference terminal according to an embodiment of the present invention.

FIG. 5 is a block diagram showing an example of the construction of the video conference terminal 1a in this embodiment. Since the other video conference terminals 1b, 1c and 1d have the same constructions as that of the video conference terminal 1a, only the video conference terminal 1a will be described.

The video conference terminal 1a comprises a multiplexing unit (MUX/DEMUX) 10 connected to the bi-directional digital transmission line 2a for transmitting an input signal and receiving an output signal, a command input device 11 for providing an information (privacy communication control signal) 20S of a video conference terminal which performs a privacy communication, a video camera 12 as an image pickup means, a microphone 13 as a voice collecting means, a display 14 as an image display means, a loud speaker 15 as a voice reproducing means, an image CODEC 16 for compressing an input video signal and expanding an output video signal, a voice CODEC 17 for compressing an input audio signal and expanding an output audio signal, an image muting unit 18 for controlling the output video signal and a voice muting unit 19 for controlling the output audio signal.

In the video conference terminal shown in FIG. 5, an image of a user picked up by the video camera 12, that is, an image of an attendance of the conference, is input to the image CODEC 16 as the input video signal. The image CODEC 16 compresses this video signal and outputs a resultant compressed input video signal to the multiplexing unit 10.

Voice of the user collected by the microphone 13 is input to a voice CODEC 17 as the input audio signal. The voice CODEC 17 compresses the audio signal and outputs a compressed input audio signal to the multiplexing unit 10.

The command input device 11 functioning as an identifying signal generator outputs a user input information of terminals which perform a privacy communication to the multiplexing unit 10 as the privacy communication identifying signal 20S. The privacy communication identifying signal is a series of digital signals containing an identifier of another video conference terminal assigned by the user as the other terminal of the privacy communication, an identifier of the user's video conference terminal and a code indicating that the communication is a privacy communication.

The multiplexing unit 10 receives the compressed input video signal from the image CODEC 16 as an image channel, the compressed input audio signal from the voice CODEC 17 as a voice channel and the privacy communication control signal 20S from the command input device 11 as a data channel, multiplexes these signals and outputs a resultant compressed signal to the bi-directional digital transmission path 2 as a transmitting input signal. Further, the multiplexing unit 10 receives a multiplexed output signal transmitted by the bi-directional transmission path from a multi-point control unit to be described later and separates therefrom a compressed output video signal, a compressed audio signal and an output control signal 20R.

The compressed output video signal and the compressed output audio signal thus separated are input to the image CODEC 16 and the voice CODEC 17, respectively. The image CODEC 16 and the voice CODEC 17 expand these compressed signals and inputs them to the image muting unit 18 and the voice muting unit 19 as the output video signal and the output audio signal, respectively.

The image CODEC 16, the voice CODEC 17 and the multiplexing unit 10 constitute the input signal transmitting unit and the output signal receiving unit.

The output control signal 20R from the multiplexing unit 10 is input to the image muting unit 18 functioning as the output image controller and the voice muting unit 19 functioning as the output voice controller. The image muting unit 18 and the voice muting portion 19 control the output video signal and the output audio signal to be output to the display 14 and the loud speaker 15 on the basis of the output control signal 20R.

On the other hand, the multi-point control unit 3 basically comprises the input signal receiving unit for receiving the multiplexed input signals transmitted from a plurality of multi-point video conference terminals and separating therefrom the multiplexed input video signal, the multiplexed input audio signal and the multiplexed privacy communication identifying signal, an output signal synthesizing unit for synthesizing an output video signal, an output audio signal and an output control signal from the input video signal, the input audio signal and the privacy communication signal input from the input signal receiving unit and an output signal transmitting unit for compressing and multiplexing the synthesized output video signal, the audio signal and the output control signal which are synthesized by the output signal synthesizing unit and transmitting a resultant output signal to the multi-point video conference terminals through the transmission paths.

Figure 6:
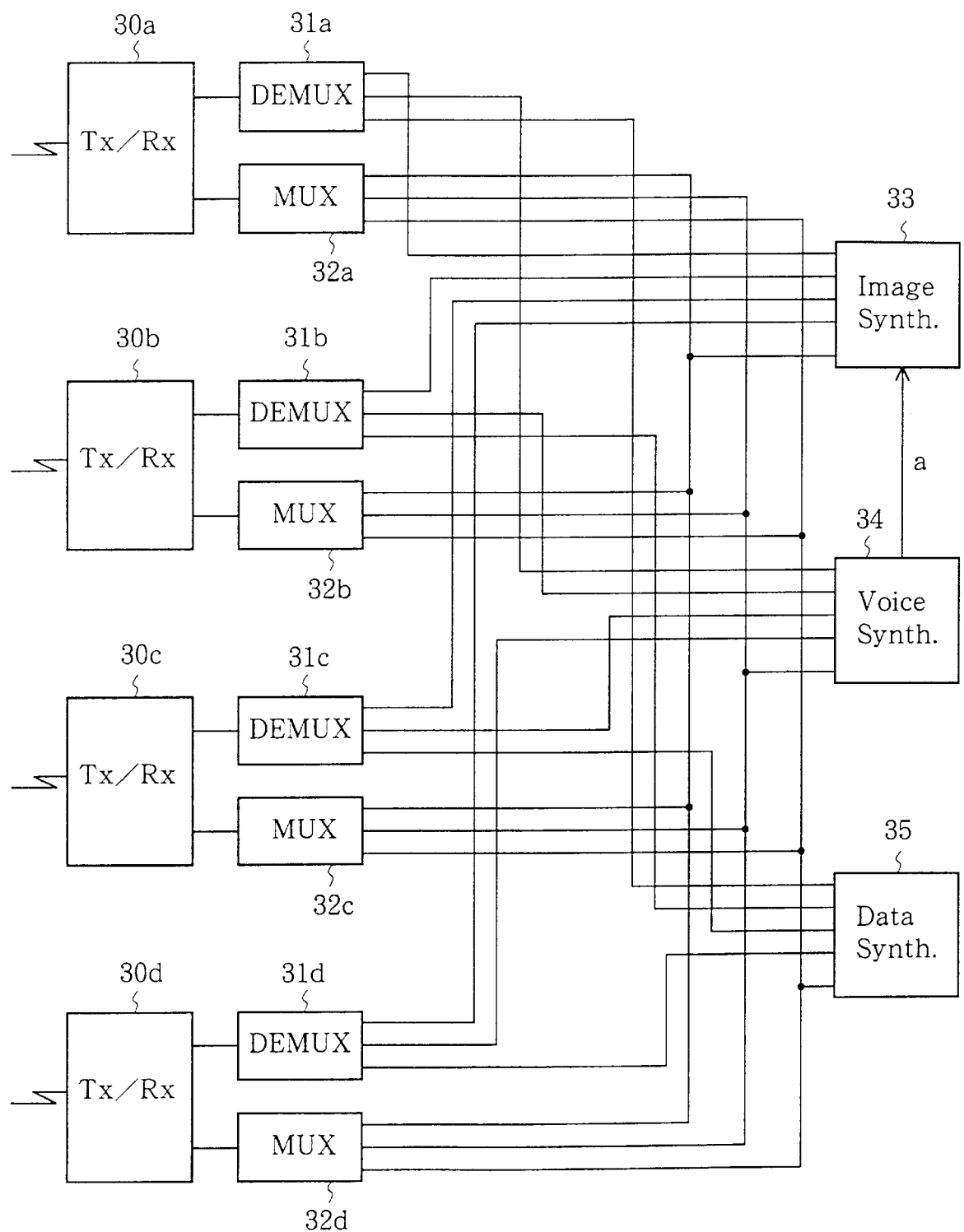
FIG. 6 is a block diagram showing a construction of a multi-point control unit (MCU) of the multi-point video conference system.

FIG. 6 shows an example of the multi-point control unit 3.

The multi-point control unit 3 includes communication units (Tx/Rx) 30a, 30b, 30c and 30d which transmit and receive information with respect to the respective video conference terminals 1a, 1b, 1c and 1d through the bi-directional digital transmission paths 2. That is, the communication units 30a, 30b, 30c and 30d receive transmitting input signals transmitted from the respective video conference terminals 1a, 1b, 1c and 1d through the bi-directional transmission paths 2 and supply them to respective demultiplexers (DEMUX) 31a, 31b, 31c and 31d also included in the multi-point control unit 3. Further, the multi-point control unit 3 includes multiplexers (MUX) units 32a, 32b, 32c and 32d. The communication units 30a, 30b, 30c and 30d receive multiplexed output signals from the respective multiplexers 32a, 32b, 32c and 32d and transmit them to the respective video conference terminals 1a, 1b, 1c and 1d through the bi-directional digital transmission paths 2. In other words, the communication units 30a to 30d and the demultiplexers 31a to 31d constitute the input signal receiving unit and the communication units 30a to 30d and the multiplexers 32a to 32d constitute the output signal transmitting unit. The output signal synthesizing unit is constituted with an image synthesizer 33, a voice synthesizer 34 and a data synthesizer 35.

The demultiplexers 31a to 31d function to separate the compressed input video signal, the input audio signal and the privacy communication identifying signal from the video conference terminals 1a to 1d from the transmitting input signal from the communication units 30a to 30d, expand them and output the input video signal, the input audio signal and the privacy communication signal to the image synthesizer 33, the voice synthesizer 34 and the data synthesizer 35, respectively. In this manner, the respective communication units 30a to 30d and the demultiplexers 31a to 31d constitute the input signal receiving unit.

The multiplexers 32a to 32d compress and multiplex the output video signal, the output audio signal and the output control signal which are synthesized in the image synthesizer 33, the voice synthesizer 34 and the data synthesizer 35, respectively, and output resultant signals to the communication units 30a to 30d, respectively.

The image synthesizer 33 synthesizes a single image on the basis of the image information received from the demultiplexers 31a to 31d and delivers it to the multiplexers 32a to 32d as the output video signal. In this case, the image synthesizer 33 receives an information a related to a video conference terminal which provides the highest voice level from the voice synthesizer 34 and uses the input video signal from that video conference terminal as the output video signal.

The voice synthesizer 34 sums the audio signals received from the respective demultiplexers 31a to 31d and delivers the sum to the multiplexers 32a to 32d as the output audio signal.

The data synthesizer 35 synthesizes the privacy communication identifying signals output from the demultiplexers 31a to 31d and delivers it to the multiplexers 32a to 32d as the output control signal containing the identifiers of the video conference terminals which are objects of the privacy communication. The output video signal, the output audio signal and the output control signal thus synthesized in the image synthesizer 33, the voice synthesizer 34 and the data synthesizer 35 are multiplexed by the multiplexers 32a to 32d and output to the respective communication units 30a to 30d.

Although it has been described that the image synthesizer 33 uses the input video signal transmitted from the video conference terminal whose voice level is the highest as the output video signal, any synthesis of image may be used in the present invention. Therefore, it may be possible to synthesize video signals transmitted from a plurality of video conference terminals to a single frame and display images of the respective attendance on one screen.

Now, an operation of the video conference system according to this embodiment will be described.

In the video conference system shown in FIG. 4, the respective video conference terminals 1a to 1d are set with identifiers prepared by using names of the conference attendance, etc. These identifiers are preliminarily transferred to all of the video conference terminals 1a to 1d within the multi-point video conference system through the multi point control unit 3. With this transfer of the identifiers, video conference terminals used in a conference at a start time of the conference are recognized and the kind of the identifiers of the attending video conference terminals is also recognized.

During the conference, images and voices of the conference attendance obtained from the video cameras 12 and the microphones 13 in the video conference terminals each shown in FIG. 5 are compressed by the image CODEC's 12 and the voice CODEC's 17, respectively, and input to the multiplexers 10. In this case, a user of one video conference terminal who requests a privacy communication assigns the other side video conference terminal through the command input device 11 thereof. The command input device 11 outputs the privacy communication identifying signal 20S containing a signal indicative of the request of privacy communication and the identifiers indicating the requesting video conference terminal and the other side video conference terminal which is an object of the privacy communication to the multiplexing unit 10 thereof In, for example, the video conference terminal 1a, when the user thereof inputs a command to the command input device 11 thereof requesting a privacy communication with the video conference terminal 1b, the command input device 11 of the video conference terminal 1a outputs the privacy communication identifying signal 20S containing the signal indicating an execution of privacy communication, the identifier of the video conference terminal 1a and the identifier of the video conference terminal 1b which is the object of the privacy communication. The multiplexing unit 10 of the video conference terminal 1a multiplexes the privacy communication identifying signal 20S with the compressed input video signal and the compressed input audio signal and sends a resultant signal to the bi-directional digital transmission line 2 as the transmitting input signal. The multi-point control unit 3 synthesizes the output video signal, the output audio signal and the output control signal from the multiplexed signals sent from the video conference terminals 1a to 1d and sends the output signal obtained by multiplexing these signals to the bi-directional digital transmission paths 2.

The transmitting multiplexed signal transmitted from, for example, the video conference terminal 1a is received the communication unit 3a of the multi-point control unit 3 and the privacy communication identifying signal 20S containing the information of privacy communication request between the video conference terminals 1a and 1b is separated in the demultiplexer 31a. The privacy communication identifying signals transmitted from the respective video conference terminals are synthesized to the output control signal in the data synthesizer 35. When a privacy communication is to be performed between certain video conference terminals, the output control signal contains the privacy communication identifying signal, that is, the signal indicating that a privacy communication is requested, and the identifiers of the certain video conference terminals which are the objects of the privacy communication. The output control signal is sent from the data synthesizer 35 to the multiplexers 32a to 32d and multiplexed with the output video signal and the output audio signal therein and transferred from the communication units 30a to 30d to the respective video conference terminals 1a to 1d. As a result, the information of the privacy communication between the video conference terminals 1a and 1b requested by the user of the video conference terminal 1a is transferred to all of the video conference terminals 1a to 1d.

The multiplexers 10 of the respective video conference terminals 1a to 1d receive the multiplexed output signal transmitted by the multi-point control unit 3 through the bi-directional transmission paths 2 and separates the compressed video signal, the compressed output audio signal and the output control signal 20R from the multiplexed output signal.

The privacy communication control signal 20S output from the command input device 11 of the video conference terminal 1 is delivered by the multi-point control unit 3 to all of the video conference terminals 1a to 1d. Therefore, the privacy communication identifying signal containing the information of the privacy communication between the video conference terminals 1a and 1b is output as the output control signal 20R multiplexed by the multiplexers 10 of the respective video conference terminals and separated by the multi-point control unit 3.

The output signal transmitted from the multi-point control unit 3 is received by the multiplexers 10 of the respective video conference terminals 1a to 1d and separated thereby to the output video signal, the output audio signal and the output control signal. The separated compressed output video signal and compressed output audio signal are input to the image CODEC 16 and the voice CODEC 17, respectively. The image CODEC 16 and the voice CODEC 17 expand these compressed signals and input the expanded signals to the image muting unit 18 and the voice muting unit 19 as the output video signal and the output audio signal, respectively. The output control signal 20R output from the multiplexing unit 10 is input to the image CODEC 16 and the voice CODEC 17.

A construction and operation of the image muting unit 18 are shown in FIGS. 7a and 7b. The image muting unit 18 includes an image frame memory 40 and an image switch 41. The image switch 41 responds to the output control signal 20R to control a write operation of the image frame memory 40 as to be described below.

That is, the image muting unit 18 refers to the output control signal 20R and, when a privacy communication is being performed between certain video conference terminals and the identifier of one of the video conference terminals performing the privacy communication, which is input as the output control signal 20R, coincides with the identifier of its own video conference terminal, that is, it is recognized that the latter video conference terminal is an object of the privacy communication, the switch 41 is turned on (FIG. 7a) to write the output video signal input to the image CODEC 16 in the image frame memory 40, read the output video signal already written in the image frame memory 40 and display it on the display 14. Therefore, in this case, the images picked up by the video cameras 12 of the respective video conference terminals and synthesized is displayed.

On the other hand, when the identifier of the video conference terminal performing the privacy communication, which is input as the output control signal 20R is not coincident with its own identifier, that is, when it is recognized that the own video conference terminal is not an object of the privacy communication, the switch 41 is turned off to stop the write of the output video signal input from the image CODEC 16 in the image frame memory 40, read the output video signal already written in the image frame memory 40 and display it on the display 14 (FIG. 7b). In this case, since the output video signal input from the image CODEC 16 is not input to the image frame memory 40 and the display 14, an image which has been stored in the image frame memory 40, that is, a still image immediately before the turning off of the image switching switch 41, is displayed on the display 14.

Incidentally, when the video conference terminal is assigned as an object of the privacy communication by neither of the video conference terminals which performs the privacy communication, the switch 41 is turned on.

Similarly, the voice muting unit 19 includes a voice switching switch 50 for switching the output audio signal according to the output control signal 20R and a dummy resistor 51, as shown in FIGS. 8a and 8b. The dummy resistor 51 is provided as a dummy load for the loud speaker 20 when the switch 50 is connected to a contact B.

With such construction, when the identifier of one of the video conference terminals performing the privacy communication, which is input as the output control signal 20R, coincides with its own identifier, the switch 50 of the voice muting unit 19 is connected to the A side to input the output audio signal from the voice CODEC 17 to the loud speaker 15 (FIG. 8a). As a result, a sound obtained by synthesizing voices collected by the microphones 13 of the respective video conference terminals is output from the loud speakers 15. On the other hand, when the identifier of one of the video conference terminals performing the privacy communication, which is input as the output control signal 20R, does not coincides with the identifier of its own video conference terminal, the switch 50 is connected to the B side, so that the output audio signal input from the voice CODEC 17 is not output to the loud speaker 15 (FIG. 8b). Therefore, there is no sound produced by the loud speaker 15.

In the multi-point video conference system according to this embodiment, the control necessary to realize the privacy communication function is performed in each of the video conference terminal. Therefore, the multi-point control unit is not always required to equip with a function related to a privacy communication so long as it can synthesize the output video signal, the output audio signal and the output control signal and the general utility of the multi-point control unit is not lost in the combination with the video conference terminals. Further, it becomes possible to realize the privacy communication function by merely providing the image muting unit 18 and the voice muting unit 19 which are simple in construction in each of the video conference terminals.

As described hereinbefore, the multi-point video conference system according to the present invention can realize a privacy communication between specific video conference terminals by providing in each of the video conference terminals related to the multi-point video conference system an image controller for muting an image and, instead thereof, display a still image and a voice controller for muting a voice to thereby make the loud speaker silent, when an associated video conference terminal is not an object of the privacy communication, without adding any special devices to the multi-point control unit which is usually expensive. That is, it is possible to realize the privacy communication at low cost by slightly modifying the usual multi-point video conference terminal.

Further, the multi-point video conference terminal according to the present invention can hold its own general usability in the combination of the multi-point control unit and the multi-point video conference terminals. Therefore, it is possible to realize the privacy communication by using the usual multi-point control unit having general usability and further to realize an inexpensive privacy communication without adding any special device to the usual products.

What is claimed is:

1. A multi-point video conference system including a multi-point control unit and a plurality of multi-point video conference devices arranged in a plurality of points and connected to said multi-point control unit through transmission paths, for transmitting and receiving images and voices between the plurality of said multi-point video conference devices at the points, said multi-point control unit comprising:

means for synthesizing output video signals, output audio signals and output control signals from input signals which include input video signals, input audio signals and privacy communication identifying signals for identifying other video conference devices which are objects of a privacy communication transmitted from the plurality of said multi-point video conference devices and transmitting the synthesized signals to said respective multi-point video conference devices, each of said multi-point video conference devices comprising:

an identifying signal generator for generating the privacy communication identifying signal;

an input signal transmitter for transmitting the input signal obtained by multiplexing an input video signal, an input audio signal and a privacy communication identifying signal of a user of said multi-point video conference device to said transmission path;

an output signal receiver for receiving an output signal obtained by multiplexing an output video signal, an output audio signal and an output control signal transmitted from said multi-point control unit through said transmission path and separating the output video signal, the output audio signal and the output control signal; and an output image control portion and an output voice control portion, for controlling the output video signal input to an image display means of said multi-point video conference device and the output audio signal input to an audio reproducing means of said multi-point video conference device on the basis of the output control signal, respectively, said output image control portion comprising:

an output image memory portion for temporarily storing the output video signal from said output signal receiver; and means for determining, on the basis of the output control signal, whether or not said multi-point video conference device is an object of the privacy communication when any multi-point video conference devices perform a privacy communication, supplying the output video signal from said output signal receiver to said image display means when said multi-point video conference device is an object of the privacy communication or supplying an output video signal preliminarily stored in said output image memory portion to said image display means when said multi-point video conference device is not the object of privacy communication, said output voice control portion comprising:

means for determining, on the basis of the output control signal, whether or not said multi-point video conference device is an object of the privacy communication when any multi-point video conference devices perform a privacy communication, supplying the output audio signal to said voice reproducing means when said multi-point video conference device is an object of the privacy communication or muting the input signal of said voice reproducing means when said multi-point video conference device is not an object of the privacy communication.

2. A multi-point video conference system as claimed in claim 1, wherein said output image control portion of said multi-point video conference device determines whether or not said multi-point video conference device is an object of the privacy communication when any multi-point video conference devices perform a privacy communication, inputs the output video signal output from said output signal receiver in the image display means of said multi-point video conference device and said output image memory portion when said multi-point video conference device is an object of the privacy communication and, when said multi-point video conference device is not an object of the privacy communication, inputs an output video signal already stored in said output image memory portion in said image display means to display on said image display portion the image from immediately before the privacy communication was started during the privacy communication.

3. A multi-point video conference device for transmitting an input video signal and an input audio signal to a multi-point control unit and displaying and reproducing an output image and an output voice received from said multi-point control unit, comprising;

an identifying signal generator for generating a privacy communication identifying signal for identifying another multi-point video conference device which is an object of a privacy communication;

an input signal transmitter for transmitting an input signal obtained by multiplexing an input video signal, an input audio signal and the privacy communication identifying signal to said transmission path;

an output signal receiver for receiving an output signal obtained by multiplexing an output video signal, an output audio signal and an output control signal transmitted from said multi-point control unit through said transmission path and separating the output video signal, the output audio signal and the output control signal; and an output image control portion and an output voice control portion, for controlling the output video signal input to an image display means of said multi-point video conference device and the output audio signal input to an audio reproducing means of said multi-point video conference device on the basis of the output control signal, respectively, said output image control portion comprising:

an output image memory portion for temporarily storing the output video signal from said output signal receiver; and means for determining, on the basis of the output control signal, whether or not said multi-point video conference device is an object of the privacy communication when any multi-point video conference devices perform a privacy communication, supplying the output video signal from said output signal receiver to said image display means when said multi-point video conference device is an object of the privacy communication or supplying an output video signal preliminarily stored in said output image memory portion to said image display means when said multi-point video conference device is not an object of the privacy communication, said output voice control portion comprising:

means for determining, on the basis of the output control signal, whether or not said multi-point video conference device is an object of the privacy communication when any multi-point video conference devices perform a privacy communication, supplying the output audio signal to said voice reproducing means when said multi-point video conference device is an object of the privacy communication or muting the input signal of said voice reproducing means when said multi-point video conference device is not an object of the privacy communication.

4. A multi-point video conference device comprising:

image pickup means for picking up an image of a user and providing an input video signal;

sound collecting means for collecting a voice of the user and providing an input audio signal;

an identifying signal output portion for providing a privacy communication identifying signal for identifying another multi-point video conference device assigned by the user as an object of a privacy communication;

an input signal transmitter for multiplexing the input video signal, the input audio signal and the privacy communication identifying signal and transmitting a resultant multiplexed signal to a transmission path as an multiplexed input signal;

an output signal receiver for receiving a multiplexed output signal transmitted from a multi-point control unit through said transmission path, separating it to an output video signal, an output audio signal and an output control signal and providing the output video signal, the output audio signal and the output control signal;

an output image control portion for controlling the output video signal on the basis of the output control signal; and image display means responsive to the audio signal controlled by said output voice control means for reproducing a voice, wherein said output image control portion comprises:

an output image memory portion for temporarily storing the output video signal output from said output signal receiver; and means for determining, on the basis of the output control signal, whether or not said multi-point video conference device is an object of the privacy communication when any multi-point video conference devices perform a privacy communication, supplying the output video signal from said output signal receiver to said image display means when said multi-point video conference device is an object of the privacy communication or supplying an output video signal preliminarily stored in said output image memory portion to said image display means when said multi-point video conference device is not an object of the privacy communication, and wherein said output voice control portion comprises:

means for determining, on the basis of the output control signal, whether or not said multi-point video conference device is an object of the privacy communication when any multi-point video conference devices perform a privacy communication, supplying the output audio signal to said voice reproducing means when said multi-point video conference device is an object of the privacy communication or muting the input signal of said voice reproducing means when said multi-point video conference device is not an object of the privacy communication.

* * * * *